United States Patent
Le et al.

(10) Patent No.: US 9,081,245 B2
(45) Date of Patent: *Jul. 14, 2015

(54) ELECTROCHROMIC DEVICE WITH IMPROVED TRANSPARENT CONDUCTOR AND METHOD FOR FORMING THE SAME

(71) Applicant: Intermolecular, Inc., San Jose, CA (US)

(72) Inventors: Minh Huu Le, San Jose, CA (US); Thai Cheng Chua, Cupertino, CA (US); Guowen Ding, San Jose, CA (US); Minh Anh Nguyen, San Jose, CA (US); Yu Wang, San Jose, CA (US); Guizhen Zhang, Santa Clara, CA (US)

(73) Assignee: Intermolecular, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/102,768

(22) Filed: Dec. 11, 2013

(65) Prior Publication Data

US 2014/0092462 A1  Apr. 3, 2014

Related U.S. Application Data

(63) Continuation of application No. 13/338,074, filed on Dec. 27, 2011, now Pat. No. 8,665,511.

(51) Int. Cl.
  *G02F 1/153* (2006.01)
  *G02F 1/155* (2006.01)

(52) U.S. Cl.
  CPC .................................. *G02F 1/155* (2013.01)

(58) Field of Classification Search
  CPC ....................................................... G02F 1/155
  USPC .................................. 359/265–275; 345/105
  See application file for complete search history.

(56) References Cited

U.S. PATENT DOCUMENTS 8,665,511 B2 * 3/2014 Le et al. .......................... 359/270

* cited by examiner

*Primary Examiner* — Tuyen Tra

(57) ABSTRACT

Embodiments provided herein describe electrochromic devices and methods for forming electrochromic devices. The electrochromic devices include a transparent substrate, a transparent conducting oxide layer coupled to the transparent substrate, and a layer of electrochromic material coupled to the transparent conducting oxide layer. The transparent conducting oxide layer includes indium and zinc.

19 Claims, 3 Drawing Sheets

ELECTROCHROMIC DEVICE WITH IMPROVED TRANSPARENT CONDUCTOR AND METHOD FOR FORMING THE SAME

CROSS-REFERENCE TO RELATED APPLICATIONS

This is a Continuation of U.S. patent application Ser. No. 13/338,074, filed on Dec. 27, 2011, which is herein incorporated by reference for all purposes.

TECHNICAL FIELD

The present invention relates to electrochromic devices, such as electrochromic panels, windows, and eyewear. More particularly, this invention relates to electrochromic devices with improved transparent conductors and a method for forming such electrochromic devices.

BACKGROUND OF THE INVENTION

Electrochromic devices, such as windows, panels, and eyewear, are typically formed by constructing a stack of materials on a transparent substrate, or between two transparent substrates, such as glass. The stack usually includes an ion conductor positioned between at least two layers of electrochromic material (e.g., tungsten oxide) and two transparent conductors on opposing, outer sides of the electrochromic layers. The transparent conductors are typically made of indium-tin oxide (ITO). When a voltage is applied across the transparent conductors, ions and electrons are transferred between the layers of electrochromic material through the ion conductor. This results in a change of optical properties of the device, such as a reduction of transmission.

There are ongoing efforts to improve the overall performance of electrochromic devices while minimizing manufacturing costs. One particular area of interest is to improve the conductivity and transmittance of the transparent conductors.

BRIEF DESCRIPTION OF THE DRAWINGS

Various embodiments of the invention are disclosed in the following detailed description and the accompanying drawings.

DETAILED DESCRIPTION

Figure 1:
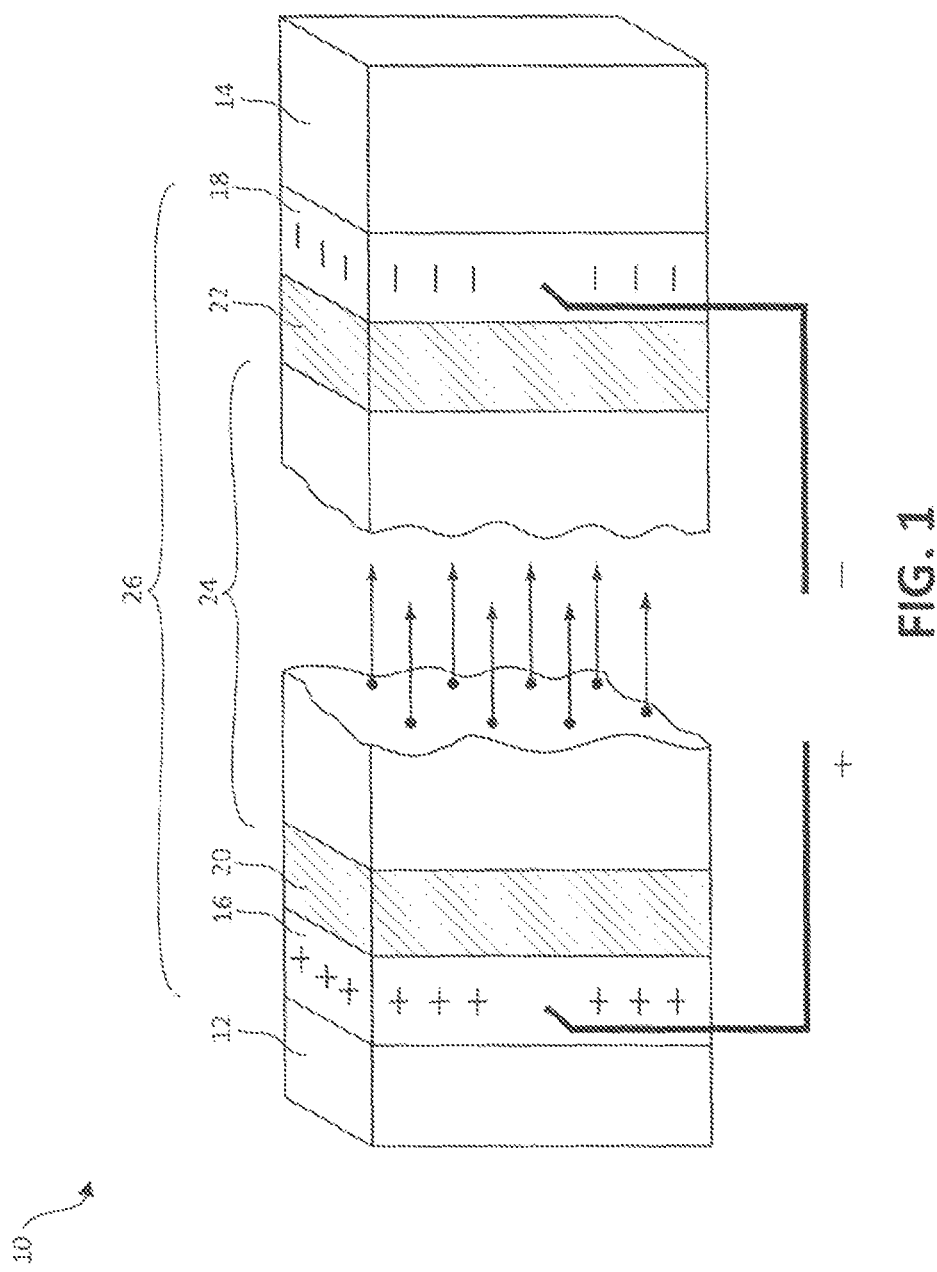
FIG. 1 is a cross-sectional schematic view of an electrochromic device according to one embodiment of the present invention.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Embodiments described herein provide electrochromic devices, such as windows, panels, and eyewear (e.g., glasses and goggles), with transparent conductors that include indium and zinc (e.g., indium-zinc oxide (IZO)). The indium-zinc transparent conductors improve the performance of the electrochromic devices when compared to conventional indium-tin oxide (ITO), as resistivity is reduced (i.e., conductivity is increased), while providing similar optical transmission. For example, indium-zinc oxide deposited at room temperature may have lower resistivity than indium-tin oxide even after being annealed. The use of indium-zinc oxide also allows for a greater range of processing conditions to be used, and the indium-zinc oxide may also have improved durability.

The transparent conductors (e.g., each of the transparent conductors) may be formed with a stack using two layers (or sub-layers) of indium-zinc oxide on opposing sides of a layer of silver. The inclusion of the silver layer reduces emissivity (i.e., increases heat reflection).

In some embodiments, an electrochromic device is provided. The electrochromic device includes a first transparent substrate, a first transparent conductive oxide (TCO) layer coupled to the first transparent substrate, and a first electrochromic material coupled to the first transparent conductive oxide layer. The first transparent conductive oxide layer includes indium and zinc.

The electrochromic device may also include a second transparent conductive oxide layer coupled to the first transparent substrate, which also includes indium and zinc. The first layer of electrochromic material, the first transparent conductive oxide layer, and the second transparent conductive oxide layer may be arranged such that when a voltage is applied across the first transparent conductive oxide layer and the second transparent conductive oxide layer, the optical transmission of the electrochromic device is changed. For example, the first layer of electrochromic material may be between the first transparent conductive oxide layer and the second transparent conductive oxide layer.

The electrochromic device may also include a second transparent substrate coupled to the second transparent conductive oxide layer. The first transparent conductive oxide layer and the second transparent conductive oxide layer may be between the first transparent substrate and the second transparent substrate.

FIG. 1 schematically illustrates an electrochromic device 10 according to one embodiment of the present invention. The electrochromic device 10 includes a first transparent substrate 12, a second transparent substrate 14, a first transparent conductor 16, a second transparent conductor 18, an ion storage film 20, an electrochromic layer 22, and an ion conductor 24.

As shown, the components of the electrochromic device 10 are arranged such that the first and second transparent substrates 12 and 14 are positioned on opposing sides of an electrochromic stack 26 that includes the ion conductor 24 at a central portion thereof. The ion storage film 20 and the electrochromic layer 22 are adjacent to and on opposing sides of the ion conductor 24. The first transparent conductor 16 is between the first transparent substrate 12 and the ion storage film 20, and the second transparent conductor 18 is between the second transparent substrate 14 and the electrochromic layer 22.

In some embodiments, the entire electrochromic stack 26 is formed on one of the transparent substrates 12 and 14 and the other transparent substrate 14 is attached using, for example, a lamination process. It should be noted though that some embodiments may use only one transparent substrate, as described below. However, in other embodiments, some of the components of the electrochromic stack 26 are formed on the first transparent substrate 12, while others are formed on the second transparent substrate 14. The two substrates are then attached using a lamination process such that the components of the electrochromic stack are "sandwiched" between the first and second transparent substrates 12 and 14 as shown in FIG. 1.

The deposition of the various layers on either of the transparent substrates 12 and 14 may be performed using, for example, a physical vapor deposition (PVD) and/or reactive (or plasma enhanced) sputtering processing tool. In one embodiment, the electrochromic stack 26 fills the entire space between the first and second transparent substrates 12 and 14. However, in other embodiments, the electrochromic stack 26 may only be formed within isolated portions of the space between the first and second transparent substrates 12 and 14.

Still referring to FIG. 1, the first and second transparent substrates 12 and 14 may be made of, for example, glass (e.g., borosilicate glass), flexible polymer foil, plastic, or polycarbonate and have a thickness of, for example, between 1 and 10 millimeters (mm). In a testing environment, the transparent substrates 12 and 14 may be round with a diameter of, for example, 200 or 300 mm. However, in a manufacturing environment, the substrate 12 may be square or rectangular and significantly larger (e.g., 0.5-3.0 meters (m) across).

In some embodiments, the first and second transparent conductors 16 and 18 are layers of indium-zinc oxide having a thickness of, for example, between about 100 and about 1000 Angstroms (Å). The indium-zinc oxide may include, for example, between about 5% and about 15% by weight zinc oxide, with the remainder being indium oxide.

The ion storage film (or first layer of electrochromatic material) 20 is, in one embodiment, made of nickel oxide and has a thickness of, for example, between about 100 and about 300 Å. The electrochromic layer (or second layer of electrochromatic material) 22 is, in one embodiment, made of tungsten oxide and has a thickness of, for example, between about 100 and about 300 Å. However, it should be understood that other electrochromic materials may be used for the ion storage film 20 and the electrochromic layer 22, which are similarly capable of conducting ions and electrons. For example, other electrochromic materials may be based on molybdenum, iridium, titanium, vanadium, nickel, and niobium.

In one embodiment, the ion conductor 24 is an electrolyte, which may be organic (e.g., an adhesive polymer) or inorganic (e.g., based on an oxide film). The ion conductor may have a thickness of, for example, between about 300 and about 800 Å. The ions within the ion conductor 24 are preferably small in order to promote mobility. Suitable examples of ions include hydrogen (H+), lithium (Li+), and magnesium ($Mg_2$+).

As schematically indicated in FIG. 1, when a voltage is applied across the first and second transparent conductors 16 and 18, ions within the ion conductor 24 are shuttled between the ion storage film 20 and the electrochromic film 22. The transportation of the ions causes the optical transmission (and/or absorption) of the device 10 to be altered, as is commonly understood. A reversal of the voltage, or short-circuiting between the transparent conductors 16 and 18, may be applied to return the device 10 to the original optical transmission.

The use of transparent conductors that include indium and zinc, as opposed to conventional indium-tin oxide, reduces resistivity, while providing similar optical properties, thus improving the overall performance of the electrochromic device 10. The use of indium-zinc oxide also allows for a greater range of processing conditions to be used, which may result in reduced manufacturing costs, while also providing improved durability.

Figure 2:
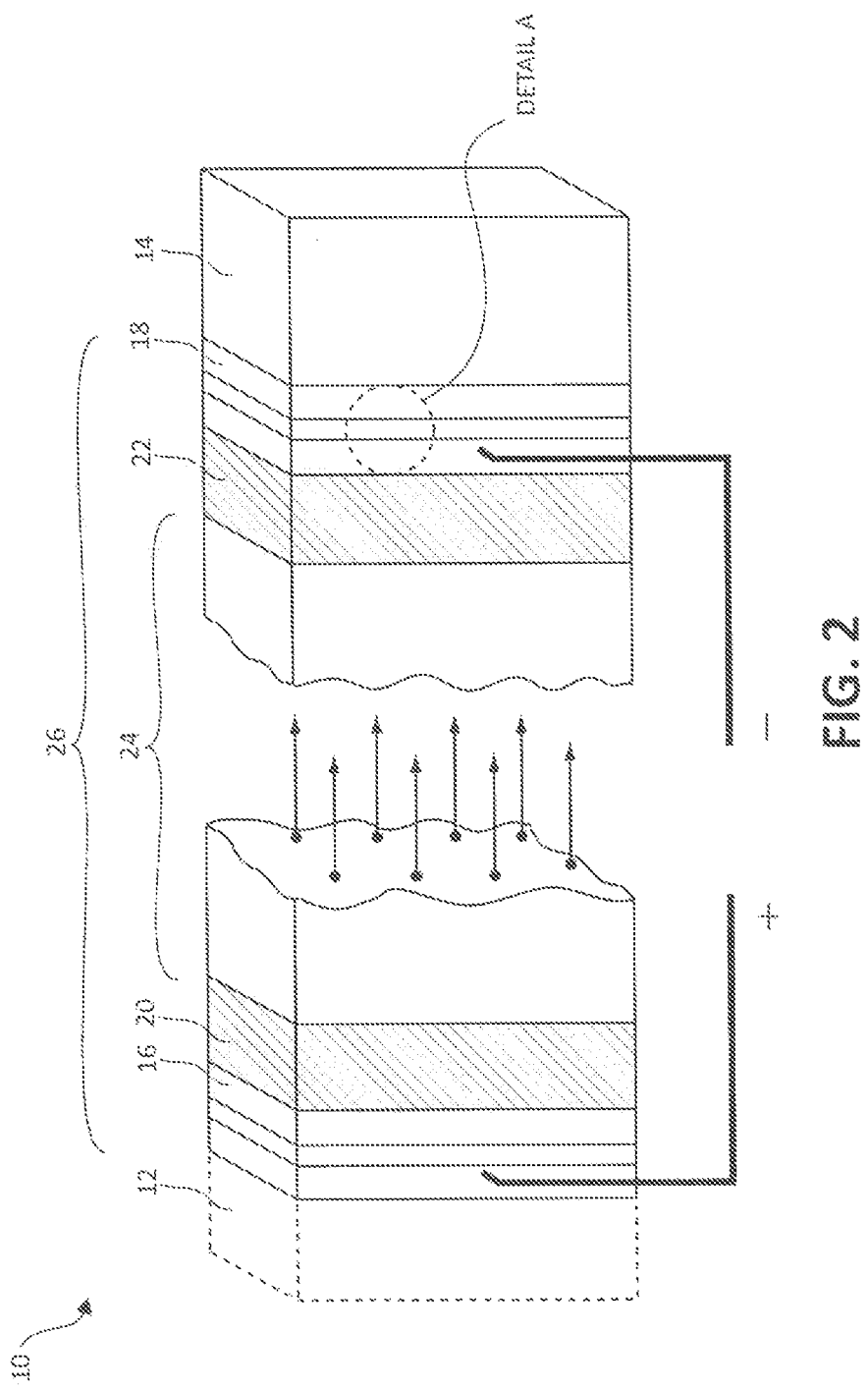
FIG. 2 is a cross-sectional schematic view of an electrochromic device according to another embodiment of the present invention.

FIG. 2 schematically illustrates the electrochromic device 10 according another embodiment of the present invention. Similar to the embodiment shown in FIG. 1, the device 10 shown in FIG. 2 includes a first transparent substrate 12, a second transparent substrate 14, a first transparent conductor 16, a second transparent conductor 18, an ion storage film 20, an electrochromic layer 22, and an ion conductor 24. In one embodiment, the first transparent substrate 12, the second transparent substrate 14, the ion storage film 20 (or first electrochromic layer), the (second) electrochromic layer 22, and the ion conductor 24 shown in FIG. 2 may be similar to those shown in FIG. 1.

Figure 3:
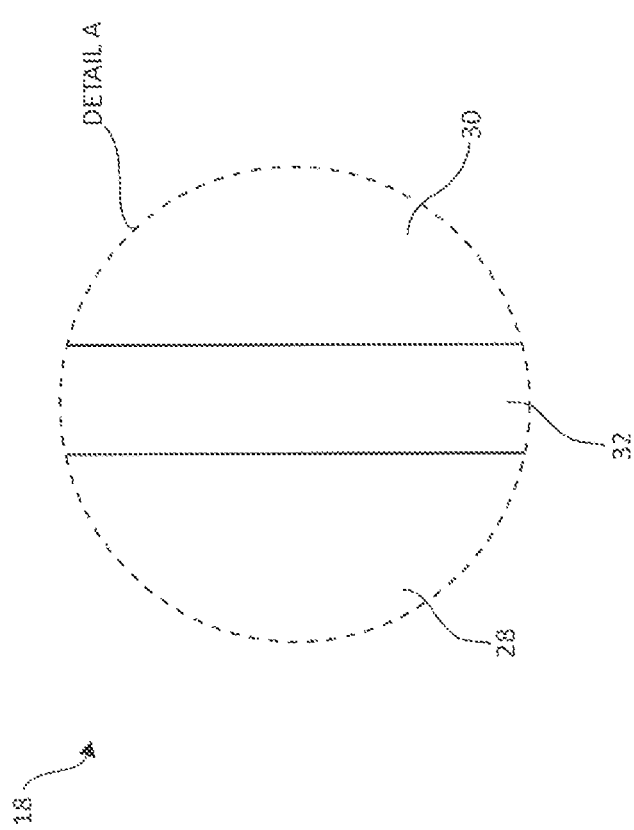
FIG. 3 is detailed cross-sectional view of transparent conductor within the electrochromic device taken on Detail A in FIG. 2.

Of particular interest in FIG. 2 are the first and second transparent conductors 16 and 18. FIG. 3 illustrates the second transparent conductor 18 as shown in Detail A of FIG. 2 in greater detail. The second transparent conductor 18 (as well as the first transparent conductor 16) in FIGS. 2 and 3 includes a transparent conductor stack that includes a first transparent conductor sub-layer 28, a second transparent conductor sub-layer 30, and an intermediate layer 32.

The first and second transparent conductor sub-layers 28 and 30 may be made of the same material as the transparent conductors described above, and thus include indium and zinc (e.g., indium-zinc oxide). The first and second transparent conductor sub-layers 28 and 30 may have a thickness of, for example, between about 50 and about 200 µm.

The intermediate layer 32 is positioned (or sandwiched) between the first and second transparent conductor sub-layers 28 and 30. In one embodiment, the intermediate layer 32 is made of silver. The intermediate layer may have a thickness of, for example, between about 20 and about 150 Å.

The electrochromic device 10 illustrated in FIGS. 2 and 3 may operate in a manner similar to that shown in FIG. 1. However, because of the intermediate layer 32 (e.g., made of silver), the resistivity of the transparent conductors is further reduced, while heat reflection is increased, allowing the electrochromic device to also operate as a low-emissivity, or low-e, panel.

Still referring to FIG. 2, although both transparent conductors 16 and 18 are shown as having the intermediate layer 32 (FIG. 3), it should be understood that in some embodiments, the intermediate layer 32 (and the transparent conductor sub-layers 28 and 30) may be used in only one of the transparent conductors 16 and 18. Additionally, as suggested above, electrochromic stack 26 of the electrochromic device 10 of both FIG. 1 and FIG. 2 may be formed on only a single transparent substrate, as opposed to being sandwiched between two transparent substrates. As such, the first transparent substrate 12 in FIG. 2 is shown with a dashed line, indicating that it may be omitted in some embodiments.

Thus, in some embodiments, an electrochromic device is provided. The electrochromic device includes a transparent substrate, a first TCO layer is coupled to the first transparent substrate. The first TCO layer includes indium and zinc. A first layer of electrochromic material is coupled to the first TCO layer.

In some embodiments, a method for forming an electrochromic device is provided. A first transparent substrate is provided. A first TCO layer is formed over the first transparent substrate. The first TCO layer includes indium and zinc. A first layer of electrochromic material is formed over the first TCO layer.

In some embodiments, an electrochromic panel is provided. The electrochromic panel includes a first transparent substrate. A first indium-zinc oxide layer is coupled to the first transparent substrate. A first layer of electrochromic material is coupled to the first indium-zinc oxide layer. A second indium-zinc oxide layer is coupled to the first layer of electrochromic material. The first indium-zinc oxide layer is between the first transparent substrate and the second indium-zinc oxide layer, and the first layer of electrochromic material is between the first indium-zinc oxide layer and the second indium-zinc oxide layer.

Although the foregoing examples have been described in some detail for purposes of clarity of understanding, the invention is not limited to the details provided. There are many alternative ways of implementing the invention. The disclosed examples are illustrative and not restrictive.

What is claimed:

1. An electrochromic device comprising:
  a first transparent substrate;
  a first transparent conducting oxide layer coupled to the first transparent substrate, and
  a first layer of electrochromic material coupled to the first transparent conducting oxide layer;
  wherein the first transparent conducting oxide layer comprises a first indium-zinc oxide sub-layer, a second indium-zinc oxide sub-layer, and a silver sub-layer formed between the first indium-zinc oxide sub-layer and the second indium-zinc oxide sub-layer.

2. The electrochromic device of claim 1, further comprising a second transparent conducting oxide layer coupled to the first layer of electrochromic material, the second oxide layer comprising indium and zinc.

3. The electrochromic device of claim 2, wherein the first layer of electrochromic material, the first transparent conducting oxide layer, and the second transparent conducting oxide layer are arranged such that when a voltage is applied across the first transparent conducting oxide layer and the second transparent conducting oxide layer, an optical transmission of the electrochromic device is changed.

4. The electrochromic device of claim 2, wherein the first layer of electrochromic material is between the first transparent conducting oxide layer and the second transparent conducting oxide layer.

5. The electrochromic device of claim 4, further comprising a second transparent substrate coupled to the second transparent conducting oxide layer, wherein the first transparent conducting oxide layer and the second transparent conducting oxide layer are between the first transparent substrate and the second transparent substrate.

6. The electrochromic device of claim 5, further comprising:
  a second layer of electrochromic material between the first transparent conducting oxide layer and the second transparent conducting oxide layer; and
  an electrolyte layer between the first layer of electrochromic material and the second layer of electrochromic material.

7. A method for forming an electrochromic device comprising:
  providing a first transparent substrate;
  forming a first transparent conducting oxide layer over the first transparent substrate, the first transparent conducting oxide layer comprising indium and zinc; and
  forming a first layer of electrochromic material over the first transparent conducting oxide layer;
  wherein the first transparent conducting oxide layer comprises a first indium-zinc oxide sub-layer, a second indium-zinc oxide sub-layer, and a silver sub-layer formed between the first indium-zinc oxide sub-layer and the second indium-zinc oxide sub-layer.

8. The method of claim 7, further comprising forming a second transparent conducting oxide layer over the first layer of electrochromic material, the second transparent conducting oxide layer comprising indium and zinc.

9. The method of claim of claim 8, wherein the first layer of electrochromic material, the first transparent conducting oxide layer, and the second transparent conducting oxide layer are arranged such that when a voltage is applied across the first transparent conducting oxide layer and the second transparent conducting oxide layer, an optical transmission of the electrochromic device is changed.

10. The method of claim 8, wherein the first layer of electrochromic material is between the first transparent conducting oxide layer and the second transparent conducting oxide layer.

11. The method of claim 10, further comprising providing a second transparent substrate coupled to the second transparent conducting oxide layer, wherein the first transparent conducting oxide layer and the second transparent conducting oxide layer are between the first transparent substrate and the second transparent substrate.

12. The method of claim 11, further comprising forming a second layer of electrochromic material between the first transparent conducting oxide layer and the second transparent conducting oxide layer.

13. The method of claim 12, further comprising forming an electrolyte layer over the first layer of electrochromic material, wherein the electrolyte layer is between the first layer of electrochromic material and the second layer of electrochromic material.

14. An electrochromic panel comprising:
  a first transparent substrate;
  a first transparent conducting oxide layer coupled to the first transparent substrate;
  a first layer of electrochromic material coupled to the first transparent conducting oxide layer; and
  a second transparent conducting oxide layer comprising indium-zinc oxide coupled to the first layer of electrochromic material;
  wherein the first transparent conducting oxide layer is between the first transparent substrate and the second transparent conducting oxide layer;
  wherein the first layer of electrochromic material is between the first-transparent conducting oxide layer and the second transparent conducting oxide layer; and
  wherein the first transparent conducting oxide layer comprises a first indium-zinc oxide sub-layer, a second indium-zinc oxide sub-layer, and a silver sub-layer between the first indium-zinc oxide sub-layer and the second indium-zinc oxide sub-layer.

15. The electrochromic panel of claim 14, wherein the first layer of electrochromic material, the first transparent conducting oxide layer, and the second transparent conducting oxide layer are arranged such that when a voltage is applied across the first transparent conducting oxide layer and the second transparent conducting oxide layer, an optical transmission of the electrochromic device is changed.

16. The electrochromic panel of claim 15, further comprising a second layer of electrochromic material between the first transparent conducting oxide layer and the second transparent conducting oxide layer.

17. The electrochromic panel of claim 16, further comprising an electrolyte layer between the first layer of electrochromic material and the second layer of electrochromic material.

18. The electrochromic panel of claim 17, further comprising a second transparent substrate coupled to the second transparent conducting oxide layer, wherein the first transparent conducting oxide layer and the second transparent conducting oxide layer are between the first transparent substrate and the second transparent substrate.

19. The electrochromic panel of claim 18, wherein the first transparent substrate and the second transparent substrate each comprise glass.

* * * * *